United States Patent
Matsuura et al.

[11] Patent Number: 5,846,460
[45] Date of Patent: Dec. 8, 1998

[54] METHOD OF PREPARING SILICON NITRIDE POROUS BODY

[75] Inventors: Takahiro Matsuura; Chihiro Kawai; Akira Yamakawa, all of Hyogo, Japan

[73] Assignee: Sumitomo Electric Industries, Ltd., Osaka, Japan

[21] Appl. No.: 686,818

[22] Filed: Jul. 26, 1996

[30] Foreign Application Priority Data

Jul. 26, 1995 [JP] Japan .................................. 7-190601
Jul. 12, 1996 [JP] Japan .................................. 8-183113

[51] Int. Cl.$^6$ .................................................. C04B 38/04
[52] U.S. Cl. .......................... 264/43; 264/42; 264/628; 264/344
[58] Field of Search .............................. 264/628, 43, 344, 264/42

[56] References Cited

U.S. PATENT DOCUMENTS

| | | | |
|---|---|---|---|
| 4,146,379 | 3/1979 | Copley | 264/43 |
| 4,177,235 | 12/1979 | Neidhardt | 264/344 |
| 4,623,498 | 11/1986 | Beckwith | 264/344 |
| 5,376,602 | 12/1994 | Nilsen | 501/97 |

FOREIGN PATENT DOCUMENTS

| | | |
|---|---|---|
| 0653392 | 5/1995 | European Pat. Off. . |
| 0712820 | 5/1996 | European Pat. Off. . |
| 3516587 | 12/1985 | Germany . |
| 61-222966 | 10/1986 | Japan . |
| 63-040711 | 2/1988 | Japan . |
| 63-107863 | 5/1988 | Japan . |
| 1153579 | 6/1989 | Japan . |
| 1188479 | 7/1989 | Japan . |
| 6-116054 | 4/1994 | Japan . |
| 6-183780 | 7/1994 | Japan . |
| WO 94/27929 | 12/1994 | WIPO . |

*Primary Examiner*—James Derrington
*Attorney, Agent, or Firm*—W. F. Fasse; W. G. Fasse

[57] ABSTRACT

A silicon nitride ceramic porous body having excellent acid and alkali resistance, mechanical strength, and durability can be employed as a filter or a catalytic carrier. The silicon nitride porous body contains a plurality of silicon nitride crystal grains with pores formed in grain boundary parts thereof, or includes a body part and a pore part wherein the body part is formed by a plurality of silicon nitride crystal grains and the pore part forms a three-dimensional network structure. The body part is formed by at least 90 vol. % of silicon nitride crystal grains, which are directly bonded to each other. In order to prepare the finished ceramic porous body, a porous body compact which is mainly composed of silicon nitride, is brought into contact with an acid and/or an alkali so that a component other than silicon nitride is partially or entirely dissolved and removed from the compact. The compact is prepared from a mixed powder of silicon nitride powder and at least one of a rare earth compound powder, a transition metal compound powder, and a bismuth compound, which is heat treated in the temperature range from 1600° C. to 2100° C.

27 Claims, 3 Drawing Sheets

METHOD OF PREPARING SILICON NITRIDE POROUS BODY

BACKGROUND OF THE INVENTION

1. Field of the Invention

The present invention relates to a silicon nitride porous body and a method of preparing the same, and more particularly, it relates to a silicon nitride porous body which can be employed as a filter or a catalytic carrier in an environment in coexistence with an acid or an alkali of high concentration, and a method of preparing the same.

DESCRIPTION OF THE BACKGROUND ART

Silicon nitride ceramic is excellent in heat resistance and thermal shock resistance, and has high strength. Due to these characteristics, the silicon nitride ceramic is worked into a porous body, to be used as a filter or a catalytic carrier which is employed in a high temperature range, in particular.

Japanese Patent Laying-Open No. 1-188479 (1989) discloses a porous body which is prepared by molding a mixed powder of relatively coarse silicon powder and silicon nitride powder and thereafter nitriding the same. On the other hand, Japanese Patent Laying-Open No. 61-222966 (1986) discloses a technique of adding gypsum to silicon powder, nitriding and sintering the mixture, and thereafter removing the gypsum part with an acid.

Further, International Patent Laying-Open No. WO94/27929 discloses a silicon nitride porous body which is formed by columnar silicon nitride grains and a method of preparing the same.

A technique of bringing ceramics into a porous state with an acid or an alkali is widely employed in relation to other ceramics and glass materials. For example, Japanese Patent Laying-Open No. 6-183780 (1994) discloses a method of preparing porous glass by eluting a soluble component from crystallized glass by an acid treatment. On the other hand, Japanese Patent Publication No. 5-72355 (1993) discloses a mullite porous body and a method of preparing the same by eluting a matrix of a ceramics sintered body containing needlelike and columnar mullite crystals with an aqueous alkaline solution and forming pores.

In addition, a material prepared by bringing oxide ceramics such as alumina or cordierite, for example, into a porous state is also known and has been used in practice.

Applied products employing such ceramics porous bodies include a filter for separating substances which are larger than the maximum pore diameter of the porous body from a gas or a liquid. Such a filter consisting of the ceramics porous body is superior in heat resistance to a generally employed organic filter, and is sterilizable using steam.

As an applied product other than the filter, it is possible to employ the ceramics porous body as a catalytic carrier by coating its surface with a metal catalyst such as platinum, for example.

Oxide ceramics having excellent acid resistance and alkali resistance are applied to a filter or a catalytic carrier, as hereinabove described. However, the oxide ceramics may be sintered during employment at a high temperature, such that the porosity or pore diameter thereof is changed. In the conventional filter or catalytic carrier consisting of oxide ceramics, further, sufficient strength may not be attained.

On the other hand, a porous body which is formed by columnar grains of silicon nitride has high strength and a sharp pore distribution, and the pore diameters can be controlled. In a step of preparing such a porous body, however, an additive which is added for facilitating crystal growth remains in the porous body. When the silicon nitride porous body is employed in a strong acid or alkaline solution, therefore, the additive is disadvantageously eluted as an impurity. This type of porous body, which is mainly formed by columnar grains of silicon nitride, may have a similar pore structure to a conventional ceramics porous body which is formed by spherical crystal grains, due to a grain boundary phase resulting from the additive.

In case of preparing a porous body by reaction sintering from silicon powder, on the other hand, it is difficult to control the pore diameters, and only low strength can be attained.

Porous glass which is mainly composed of quartz is formed by silicon oxide. Therefore, the silicon oxide is disadvantageously eluted when subjected to an alkali.

In case of employing mullite crystal grains, it is possible to obtain a porous body having higher strength and a sharper pore distribution as compared with the porous glass mainly composed of quartz, depending on the grain shape and the structure. In a step of preparing this porous body, however, it is necessary to perform elution from a matrix which is a glass phase. Depending on the size of the porous body, this elution may be insufficient. Under an environment in coexistence with a strong aqueous acid solution, there is a possibility that junctions between the crystal grains are deteriorated, which reduces the strength. Further, the strength is reduced from the initial value by an eluting operation, for a reason similar to the above.

When using the aforementioned ceramic porous body as a filter, the maximum pore diameter defines the minimum diameter of the filterable substance, as hereinabove described. Particularly when the ceramic porous body is employed for filtering a liquid, a large quantity of liquid other than the filtered substance must permeate the porous body in a unit time. In order to cope with this, it is necessary to increase the porosity or make the pore diameter distribution as sharp as possible so that the mean pore diameter approaches the maximum pore diameter. When the pore diameter distribution is sharpened in such a ceramic porous body, however, the porosity is generally reduced particularly when the filtered substance has a small diameter. Due to the aforementioned problems and a high cost, the filter made of the ceramic porous body still falls behind the organic filter in the present circumstances.

SUMMARY OF THE INVENTION

Accordingly, an object of the present invention is to provide a silicon nitride porous body which has excellent heat resistance and thermal shock resistance, as well as acid resistance and alkali resistance.

Another object of the present invention is to provide a silicon nitride porous body having excellent mechanical strength and durability in application to a filter or a catalytic carrier.

Still another object of the present invention is to provide a silicon nitride porous body which can be employed as a filter having both permeability and separatability.

The inventors have deeply studied the aforementioned problems, and have discovered that it is possible to partially or entirely dissolve and remove an additional component other than silicon nitride grains from a porous body, by preparing a compact from mixed powder of silicon nitride powder and a prescribed additive powder, heat-treating the compact at a high temperature for forming a porous body, and treating the porous body with an acid or an alkali. They have also discovered that a body part of the porous body is thus formed by at least 90 vol. % of silicon nitride crystal grains.

A silicon nitride porous body according to an aspect of the present invention contains a plurality of silicon nitride crystal grains, with pores formed in grain boundary parts thereof.

A silicon nitride porous body according to another aspect of the present invention comprises a body part and a pore part, wherein the body part is formed by a plurality of silicon nitride crystal grains and the pore part forms a three-dimensional network structure.

The body part is preferably formed by at least 90 vol. % of silicon nitride grains, and more preferably at least 99 vol. % of silicon nitride grains, while the silicon nitride crystal grains are directly bonded to each other for forming the body part.

Further, it is preferable to form at least 50 vol. % of the silicon nitride crystal grains in the fabricated porous body by β-silicon nitride crystal grains, so that the body part is mainly composed of silicon nitride crystal grains for improving the mechanical strength of the pore part of the three-dimensional network structure and attaining a sharper pore diameter distribution. In this case, it is more preferable to control the β-silicon nitride crystal grains so that at least 80 vol. % thereof are columnar grains having an average aspect ratio of at least 3 and not more than 50.

Assuming that d represents the mean width of the columnar grains in the minor axis direction, the mean pore diameter r of the porous body is preferably controlled in the range of $d/10 \leq r \leq 10 \times d$.

The volume of the pore part is preferably at least 20 vol. % and not more than 75 vol. % with respect to the overall porous body.

Preferably, the surfaces of the silicon nitride crystal grains are hydrophilic.

A fine filter is formed by the inventive silicon nitride porous body.

A method of preparing a silicon nitride porous body according to the present invention involves preparing a porous body mainly composed of silicon nitride and bringing the porous body into contact with an acid, thereby at least partially dissolving and removing a component other than the silicon nitride. In this case, the porous body which is brought into contact with an acid may be further brought into contact with an alkali, so that an alkali-soluble component is also removed.

The method of preparing a porous body that is mainly composed of silicon nitride and that serves as a target treated with an acid and/or an alkali as described above comprises the steps of preparing a mixed powder by adding a prescribed powder to silicon nitride powder, preparing a compact from the mixed powder, and heat treating the compact in a nitrogen-containing atmosphere in a prescribed temperature range.

In this method, the blending composition of the mixed powder and heat treatment conditions for the compact may be in three combinations, as shown in Table 1.

TABLE 1

| | Blending Composition of Mixed Powder (numerical value: volume percentage of specified element in terms of oxide) | | | |
| --- | --- | --- | --- | --- |
| | rare earth element compound powder | powder of compound of transition metal element other than rare earth element | bismuth compound powder | Heat Treatment Conditions for Compact |
| (i) | 1 to 20 | — | — | in nitrogen-containing atmosphere 1700 to 2100° C. |
| (ii) | 1 to 20 | in exces of 0 and not more than 10 | — | in nitrogen-containing atmosphere 1600 to 2100° C. |
| (iii) | 1 to 20 | — | in excess of 0 and not | in nitrogen-containing atmosphere |
| | | 0 and not | more than 10 | 1600 to 1800° C. |

The silicon nitride powder serving as raw material powder preferably contains at least 90 vol. % of silicon nitride powder in the form of any of α-silicon nitride, β-silicon nitride or amorphous silicon nitride. The most preferable is the use of α-silicon nitride and amorphous silicon nitride powders. A whisker-like raw material is not preferable, because it is not possible to control pore diameter, porosity, pore distribution and strength of the porous body, in case of using silicon nitride whiskers. Also, the replacement of silicon nitride component during liquid phase sintering does not occur in case of using silicon nitride whiskers. In this case, the oxygen content in the silicon nitride powder is more preferably at least 1 wt. % and not more than 8 wt. %.

The porous body which is treated with an acid and/or an alkali is preferably further heat treated in the atmosphere at a temperature of at least 200° C. and not more than 1500° C. The heat treatment is preferably performed in the atmosphere at a temperature of at least 200° C. and not more than 1000° C.

In the method of preparing the porous body mainly composed of silicon nitride serving as the target that is treated with an acid and/or an alkali, the aforementioned step of preparing the mixed powder preferably includes a step of further adding a carbon source to the aforementioned silicon nitride powder so that not more than 1.0 wt. % of carbon remains in the compact before the heat treatment step.

The silicon nitride porous body according to the present invention contains a plurality of silicon nitride crystal grains, and the pores are formed in the grain boundary parts thereof. Alternatively, the silicon nitride porous body according to the present invention comprises a body part and a pore part, so that the body part is formed by a plurality of silicon nitride crystal grains and the pore part forms a three-dimensional network structure. In this case, the abundance ratio of the silicon nitride crystal grains forming the body part is preferably at least 90 vol. %, more preferably at least 99 vol. %, in the part other than the hole or pore part, i.e., in the body part. Silicon nitride crystals are so stable that the same stably exist even under an environment containing an acid and/or an alkali. This leads to an advantage that a filter or a catalytic carrier prepared from the inventive porous body exerts no influence on a gas or liquid being filtered or treated. If the abundance ratio of the silicon nitride crystal grains is less than 90 vol. %, however, elution or chemical reaction is easily caused under such an environment, such that a catalytic carrier prepared from the porous body may act as catalytic poison to reduce reaction, for example.

In this case, at least 50 vol. % of the silicon nitride crystal grains forming the body part are preferably β-silicon nitride crystal grains. If the ratio of the β-silicon nitride crystal grains is less than 50 vol. %, the number of α-silicon nitride crystal grains is increased, leading to a tendency that bonding between the crystal grains is weakened. In that case, when the additive existing in the bonded portions is treated with an acid or an alkali, therefore, the strength of the porous body may be so reduced that a filter or a catalytic carrier prepared from the porous body is inferior in durability if particularly high strength is required thereof.

More preferably, at least 80 vol. % of the β-silicon nitride crystal grains are formed by columnar grains. In addition to the columnar grains, grains having shapes close to polygonal and spherical ones may be formed as the β-silicon nitride crystal grains. These shapes weaken the bonding between the crystal grains, also in case of the α-silicon nitride crystal grains.

Further, it is more preferable that the average aspect ratio is at least 3 and not more than 50 in the columnar grains of the β-silicon nitride crystals forming the body part. If the average aspect ratio is less than 3, the structure approaches that of a pore part formed by grains having crystal shapes other than those of columnar grains, and hence it is difficult to obtain a porous body structure mainly composed of columnar grains. In this case, it is particularly difficult to obtain a structure provided with a hole or pore part of a three-dimensional structure having high strength and a sharp pore diameter distribution. If the average aspect ratio is in excess of 50, on the other hand, target shapes may not be attained unless a heat treatment is performed under a high temperature and a high pressure for a longer time in order to achieve crystal growth by heat treating the compact, and hence the cost may be increased.

In order to obtain a more preferable functional structural body, it is necessary to control the pore diameters as follows, in addition to the aforementioned conditions: Assuming that d represents the mean width of the columnar grains of the β-silicon nitride crystals in the minor axis direction and r represents the mean pore diameter of the porous body, the relation $d/10 \leq r \leq 10 \times d$ is preferably satisfied. More preferably, the relation $d/10 \leq r \leq 2 \times d$ is satisfied. When the mean width d and the mean pore diameter r satisfy the aforementioned expression(s), the pores formed on the surface and in the interior of the silicon nitride porous body are in the form of long slits or wedges. Due to this shape effect, grains smaller than an equivalent diameter (e.g., a result of measurement with a mercury porosimeter) converted from circles of the same areas can be filtrated (slit effect). When the inventive silicon nitride porous body is used as a filter, the permeation flow rate is important as a factor of the performance of the filter. This permeation flow rate is proportionate to the sectional area of the pores:

(permeation flow rate)=K·(sectional area of pores)/(thickness)

The conventional filter has substantially circular pores, and the size of permeable grains is substantially identical to the sectional area of the pores. On the other hand, a filter consisting of the inventive silicon nitride porous body can collect grains smaller than a pore diameter calculated by area conversion. In other words, it is possible to filtrate or filter out grains using pores having a larger sectional area than the filtrated grains, thereby attaining high permeability.

FIG. 1 illustrates the relation between mean widths of columnar grains and mean pore diameters. A slit effect can be attained in a hatched region in FIG. 1. In regions out of this range, the sectional shapes of the pores approach circles, and the aforementioned slit effect cannot be attained.

The volume of the pore part is preferably at least 20 vol. % and not more than 75 vol. % with respect to the overall porous body. In other words, the porosity is preferably at least 20 vol. % and not more than 75 vol. %. More preferably, this ratio is at least 40 vol. % and not more than 60 vol. %. If the porosity is smaller than 20 vol. %, then pores, called closed pores, that are not directly continuous with the remaining pores may be formed and the function of the filter may not be sufficiently attained. If the porosity is in excess of 75 vol. %, on the other hand, then the distances between the columnar grains of the β-silicon nitride crystals are so increased that it is difficult to attain the aforementioned slit effect.

The porous body according to the present invention may contain an unavoidable impurity which is insoluble in an acid or an alkali in its interior.

In the silicon nitride porous body according to the present invention, an unavoidable impurity may be formed under any of the following conditions (1) and (2):

(1) A nitride or a carbide is formed as a transition metal compound:

In this case, a carbide or a nitride is employed as a transition metal compound which is added for controlling the crystal structure of the silicon nitride porous body. Such a compound is hardly eluted in an acid, and is present between the columnar grains of the silicon nitride crystals. If the ratio of this compound is high, then formation of the columnar grains is inhibited. Particularly when this compound is contained to an extent of at least 8 vol. %, the ratio of the columnar grains of the silicon nitride crystals is reduced and the target structure of the present invention cannot be obtained. If the difference between thermal expansion coefficients of the silicon nitride crystal grains and the compound is large, thermal shock resistance is disadvantageously reduced. If the ratio of this compound is less than 1 vol. %, on the other hand, formation of the columnar grains of the silicon nitride crystals is hardly influenced and the ratio of the columnar grains in the β-silicon nitride crystal grains is almost 100%.

If the additive powder has smaller grain diameters than the raw material powder of silicon nitride, then the additive powder may be partially nitrided such that nitrided grains are dispersed as fine crystals in the interior of the crystal-grown columnar grains of the silicon nitride crystals. In this case, the dispersed fine crystals exert no direct influence on the structure of the silicon nitride crystal grains forming the porous body. Therefore, the presence of the fine crystals will not deteriorate the performance of the inventive silicon nitride porous body.

(2) A carbide or a nitride of B or Si is mixed as an impurity:

Following diffusion from a BN setter which is employed for firing the compact or formation of SiC in a carbon reducing atmosphere, a nitride or a carbide of any of the elements belonging to the groups IIIA and IVA of the periodic table may be mixed into the porous body. Similarly to the compound in the above item (1), this compound is hardly eluted in an acid, and is present between the columnar grains of the silicon nitride crystals. If the ratio of such a mixed compound is high, formation of the columnar grains of the silicon nitride crystals is inhibited. Particularly when such a nitride or carbide is contained to an extent of at least 8 vol. %, the ratio of the columnar grains of the silicon nitride crystals is reduced and the target structure of the present invention cannot be obtained. If the difference between thermal expansion coefficients of the carbide or nitride and the silicon nitride crystal grains is large, thermal shock resistance is disadvantageously reduced. If the ratio of the carbide or nitride is less than 1 vol. %, on the other hand, then formation of the columnar grains of the silicon nitride crystals is hardly influenced by the carbide or nitride and the ratio of the columnar grains in the β-silicon nitride crystal grains is almost 100%.

In the method of preparing a silicon nitride porous body according to the present invention, a grain boundary phase part other than a skeleton formed by the silicon nitride crystal grains can be eluted by treating the porous body mainly composed of silicon nitride with an acid. In this case, the acid can be hydrochloric acid, sulfuric acid or nitric acid, or an acid prepared by combining these acids. The pH value of the acid is set to be not more than 4. If a weak acid having a pH value exceeding 4 is employed, there is a possibility that a long time is required for eluting the grain boundary phase part. While it is also possible to apply heat or pressure in the acid treatment, the grain boundary phase part can be sufficiently eluted under conditions of room temperature and atmospheric pressure.

When a silicon oxide is formed on the surfaces of the silicon nitride crystal grains forming the porous body treated in the inventive method, the grain boundary phase part is eluted by an alkali treatment. In this case, the employed alkali can be potassium hydroxide or sodium hydroxide. As to the alkalinity, the pH value is preferably at least 13. If a weak alkali having a pH value of less than 13 is employed, there is a possibility that a long time is required for eluting the grain boundary phase part. While it is also possible to apply heat or pressure in the alkali treatment, the grain boundary phase part can be sufficiently eluted under conditions of room temperature and atmospheric pressure.

It is possible to partially or entirely remove the grain boundary phase part formed by the additive through the aforementioned acid or alkali treatment. Thus, it is possible to obtain a silicon nitride porous body in which silicon nitride crystal grains are directly bonded to each other for mainly forming a skeleton part. In this case, the ratio of the silicon nitride grains occupying the body part of the silicon nitride porous body is preferably at least 90 vol. %, more preferably at least 99 vol. %.

When the porous body treated with the acid and/or the alkali is further heat treated in the atmosphere in the temperature range of at least 200° C. and not more than 1000° C., an oxy-nitride remaining after the acid and/or alkali treatment can be homogeneously distributed on the surfaces of the silicon nitride crystal grains. Due to the heat treatment, an element inhibiting the slit effect can be removed. Further, an Si-O-N film formed on the surface is hydrophilic, whereby pure water permeability of the porous body is improved as compared with that before the heat treatment.

If the aforementioned heat treatment is performed at a temperature lower than 200° C., however, the oxy-nitride remains unchanged and the aforementioned effect cannot be attained. If the heat treatment is performed at a temperature higher than 1000° C., on the other hand, oxidation of the silicon nitride crystal grains progresses and reduces the strength. When the decrease in strength is permitted, the temperature can exceed 1000° C., up to 1500° C.

In the aforementioned heat treatment, the heating time is not particularly defined. However, the heat treatment is preferably performed in the atmosphere for not more than five hours, in consideration of the preparation cost.

Before the acid treatment, the porous body preferably has porosity of at least 19 vol. % and not more than 74 vol. %. If the porosity is not more than 19 vol. %, the pores may be partially blocked in the interior. Thus, the acid solution may hardly infiltrate into the interior of the porous body during the acid treatment. If the porosity is larger than 74 vol. %, on the other hand, the porous body to be treated is so easy to break that the same is hard to handle in case of performing the acid treatment.

In the method of preparing the porous body to be subjected to the acid or alkali treatment, a compound of a rare earth element, a transition metal element or bismuth is added to the raw material powder.

The compound of the rare earth element is adapted to react with an oxide layer which is present on the surface of the silicon nitride powder during the heat treatment of the compact for forming a liquid phase, dissolving silicon nitride and depositing columnar β-silicon nitride crystal grains. After the heat treatment, further, the compound of the rare earth element is present as a grain boundary phase in the exterior of α- and β-silicon nitride crystal grains. The term "rare earth element" indicates any of scandium (Sc), yttrium (Y) and lanthanoid elements. The compound of the rare earth element is suitably added in the range of 1 to 20 vol. %, and more preferably in the range of 2 to 15 vol. % in terms of an oxide. The grain boundary phase may be in the form of silicate or oxy-nitride. If the content of the compound of the rare earth element is less than 1 vol. %, then the β-silicon nitride crystal grains are not sufficiently brought into columnar shapes. If the content exceeds 20 vol. %, on the other hand, then bonding between the silicon nitride crystal grains is so inhibited that a large amount of oxy-nitride is formed to suppress formation of the columnar grains of the silicon nitride crystals. When the obtained porous body is treated with the acid or the alkali, therefore, its strength is disadvantageously reduced. If the compound of the rare earth element is added in a large amount, then the preparation cost is increased since the rare earth element is generally high-priced.

On the other hand, it is possible to facilitate sintering of the silicon nitride powder and reduce the formation temperature for the liquid phase by adding a compound of a transition metal element. The compound of the transition metal element is suitably added in the range in excess of 0 vol. % and not more than 10 vol. %, and more preferably in the range of at least 2 vol. % and not more than 5 vol. % in terms of an oxide of each element. If the content of the compound of the transition metal element exceeds 10 vol. %, bonding between the silicon nitride grains is so inhibited that the strength of the obtained porous body is disadvantageously reduced if the porous body is treated with an acid. Further, crystal growth is inhibited in the process of bringing the silicon nitride grains into columnar shapes, and the aspect ratio is disadvantageously reduced below 3.

Further, it has been discovered that phase transition (from α to β) or crystallization (from amorphous to β) of silicon nitride is facilitated by adding a bismuth compound in place of the compound of the transition metal element so that dissolution of the grain boundary phase part is simplified in the acid or alkali treatment on the obtained porous body, as a result of the inventors' study. Namely, it is possible to prepare a silicon nitride porous body on which an acid and/or alkali treatment can be readily performed by adding a bismuth compound in the range in excess of 0 vol. % and not more than 10 vol. %, more preferably in the range of at least 1 vol. % and not more than 5 vol. %, in place of the compound of the rare earth element added to the raw material powder of silicon nitride.

The silicon nitride powder employed as the raw material can be prepared from α-silicon nitride powder, amorphous silicon nitride powder and/or β-silicon nitride powder. It is preferable that any single silicon nitride powder occupies at least 90 vol. % of the overall silicon nitride powder. If different types of silicon nitride powder are contained in excess of 10 vol. %, formation of the columnar grains of the silicon nitride crystals or the sintering speeds for the silicon nitride powder may be dispersed to result in formation of large pores or abnormally grown grains.

The most preferable is the use of α-silicon nitride and amorphous silicon nitride powders. A whisker-like raw material is not preferable, because it is not possible to control pore diameter, porosity, pore distribution and strength of porous body, and replacement of silicon nitride component during liquid phase sintering does not occur, in case of using silicon nitride whiskers.

In the silicon nitride powder employed as the raw material, it is preferable to employ α-silicon nitride powder, β-silicon nitride powder or amorphous silicon nitride powder having an oxygen content of at least 1 wt. % and not more than 8 wt. %. If the oxygen content is less than 1 wt. %, the amount of formation of the liquid phase is so insufficient that columnar grains are hard to grow. If the oxygen content exceeds 8 wt. %, on the other hand, bonding between the silicon nitride crystal grains is so weakened that desorption of the crystal grains or the like is disadvantageously caused. Further, a large amount of oxynitride is generated to reduce the purity of silicon nitride to below 90 vol. %.

It is most general to add the aforementioned compound of the rare earth element, the transition metal element or the bismuth compound to the raw material powder as oxide powder. However, it is also possible to add a compound such as a hydroxide or an alkoxide which is decomposed to form powder of a hydroxide or an oxide to the raw material powder in the form of a liquid or a solid such as powder.

The aforementioned raw material powder and the additive powder are mixed with each other by a prescribed method such as a ball mill method, and thereafter molded. The molding can be performed by a prescribed method such as pressing or extrusion molding. The molding density is preferably at least 30% and not more than 70%, and more preferably set in the range of at least 35% and not more than 60%. Increase of the porosity of the porous body can be expected through the later acid treatment, and hence a molding density of not more than 70% is sufficient. If the molding density is less than 30% however, strength of the compact is reduced to cause a problem in handling. If the molding density exceeds 70% on the other hand, the liquid phase generated on the basis of the additive is so hard to diffuse that it is difficult to form the columnar grains of the silicon nitride crystals.

The obtained compact is heat treated in a nitrogen containing atmosphere at a temperature of at least 1600° C. after a molding assistant such as resin is removed by thermal decomposition or the like. Phase transition to β-silicon nitride (in case of employing α-silicon nitride powder or amorphous silicon nitride powder) or crystal growth (in case of employing β-silicon nitride powder) progresses due to this heat treatment, whereby the porous body is converted to that mainly consisting of columnar grains of β-silicon nitride crystals. The heat treatment temperature is varied with the composition of the additive, the grain diameters of the raw material powder, and the mean pore diameter and the porosity of the target porous body.

When only a compound of a rare earth element such as yttrium oxide is added to the silicon nitride powder serving as the raw material powder, for example, the heat treatment must be performed in a high temperature region of at least 1700° C. In this case, no further densification progresses even if the heat treatment is performed at a higher temperature, and hence the heat treatment can be performed in a temperature region extremely increasing the pore diameters.

When a compound of a transition metal other than the rare earth element is added in place of the compound of the rare earth element, on the other hand, a liquid phase is formed from a low temperature region of at least 1600° C., and silicon nitride dissolved in this liquid phase is deposited as columnar β-silicon nitride crystal grains. Therefore, it is possible to prepare a silicon nitride porous body which is mainly formed by columnar grains by a heat treatment even in the low temperature region. In this case, sufficient grain growth is not attained if the heat treatment temperature for the compact is less than 1600° C. While densification progresses when the heat treatment is performed at a high temperature, the additive which is present in the grain boundary phase is partially or entirely removed by the acid and/or alkali treatment after the heat treatment, whereby the compact can be used as a porous body.

If the mean grain diameter of the added compound of the transition metal element is smaller than that of the silicon nitride powder serving as the raw material powder, the widths of the columnar grains in the minor axis direction are increased as the amount of the additive is increased. Namely, the widths of the formed columnar grains of the silicon nitride crystals in the minor axis direction can be controlled by the amount of addition of the added compound.

In case of any additive, densification so progresses that the porosity cannot be improved by the acid and/or alkali treatment and the compact cannot be used as a porous body if the compact is heat treated at a temperature exceeding 2100° C. In the heat treatment at such a high temperature, the nitrogen partial pressure must be at least several 100 atm. and the preparation cost is disadvantageously increased in view of the apparatus.

Further, the decomposition pressure for silicon nitride is increased under a high temperature, and hence the nitrogen partial pressure must be increased depending on the heat treatment temperature. The heat treatment atmosphere may be prepared from an inactive atmosphere containing nitrogen, such as a mixed atmosphere of an inert gas such as argon (Ar) and nitrogen.

In the step of preparing the mixed powder, it is possible to increase the porosity of the finally obtained porous body by adding a carbon source such as phenol to the silicon nitride powder for leaving not more than 1.0 wt. %, more preferably at least 0.1 wt. % and not more than 0.5 wt. % of carbon in the compact before the heat treatment step, as compared with the case of adding no carbon source. If the carbon source is added to the silicon nitride powder, the carbon remaining in the compact suppresses rearrangement behavior of the silicon nitride raw material powder caused during the heat treatment, thereby suppressing reduction of the porosity following growth of crystal grains.

The carbon conceivably has the following effect, although this effect has not yet been clarified or confirmed:

The residual carbon has an action of reducing $SiO_2$ existing on the surface of the silicon nitride powder. Thus, a ratio $Y_2O_3/(SiO_2+Y_2O_3)$ in a liquid phase of $SiO_2$—$Y_2O_3$, which is formed in case of adding $Y_2O_3$ powder as an assistant, for example, increases due to reduction of $SiO_2$. Columnar crystals are readily deposited as this value is increased, and hence densification is inhibited and the porous body has high porosity.

If the carbon content before the heat treatment is less than 0.1 wt. %, the ratio of the carbon occupying the compact is so small that no effect is attained. If the carbon content exceeds 1.0 wt. %, on the other hand, the ratio $Y_2O_3/(SiO_2+Y_2O_3)$ in the liquid phase exceeds the upper limit. In this case, the liquid phase formation temperature is so increased that the liquid phase is hardly formed or a viscous liquid phase is formed and hence silicon nitride is hardly dissolved in the liquid phase, the speed of movement of the dissolved component in the liquid phase is reduced, spherical $Si_3N_4$ grains are hardly converted to columnar crystals and high strength cannot be attained as the result, although columnar crystals are readily deposited.

There are several methods of mixing in the carbon. In general, a binder containing carbon is employed for preparing a compact. The compact is subjected to a debindering treatment in the atmosphere and finally sintered, while the amount of residual carbon after the debindering treatment can be controlled by controlling the amount of the added binder and the debindering conditions. The amount of residual carbon is reduced as the debindering temperature or the debindering time is increased. Under the same debindering conditions, the binder is less removed and the amount of residual carbon is readily increased as the amount of the binder added for the molding is increased.

While the amount of residual carbon is reduced as the debindering temperature is increased, the silicon nitride powder is oxidized and hence the amount of $SiO_2$ existing on the surface of the silicon nitride powder is increased, in addition to such reduction of the amount of residual carbon, if the temperature is excessively increased. In this case, the ratio $Y_2O_3/(SiO_2+Y_2O_3)$ in the liquid phase which is present in sintering is decreased, and hence silicon nitride columnar crystal grains are hardly grown and densification readily progresses, as hereinabove described. Consequently, no three-dimensional entangled structure of silicon nitride columnar grains intended by the present invention can be attained but the porous body disadvantageously has low strength and small porosity. If the debindering temperature exceeds 1000° C., oxidation of the silicon nitride powder unpreferably abruptly progresses. If the debindering temperature is not more than 200° C., on the other hand, the binder is hardly removed and the amount of residual carbon is disadvantageously increased.

If the concentration of the carbon source remaining in the compact before the heat treatment is less than 0.1 wt. %, however, the ratio of carbon occupying the overall compact is so small that the effect of suppressing rearrangement is small. If the concentration of the carbon source remaining in the compact is in excess of 1.0 wt. %, on the other hand, the remaining carbon inhibits growth of the silicon nitride crystal grains and bonding between the crystal grains, and hence it is difficult to prepare a silicon nitride porous body in the scope of the present invention.

In case of adding a bismuth compound in place of the compound of the rare earth element or the transition metal element, the bismuth compound is evaporated at a temperature around 1850° C. and hence the compact is preferably heated in a lower temperature range. In this case, the heat treatment temperature is set to be not more than 1800° C. in general.

The porous body obtained after the heat treatment has a structure consisting of a grain boundary phase formed from the compound of the rare earth element, the transition metal element or bismuth, or a silicon material derived from the silicon nitride powder, and a skeleton formed by silicon nitride crystal grains, mainly formed by β-silicon nitride crystals, which are bonded to each other, depending on the type of the additive.

The foregoing and other objects, features, aspects and advantages of the present invention will become more apparent from the following detailed description of the present invention when taken in conjunction with the accompanying drawings.

Figure 1:
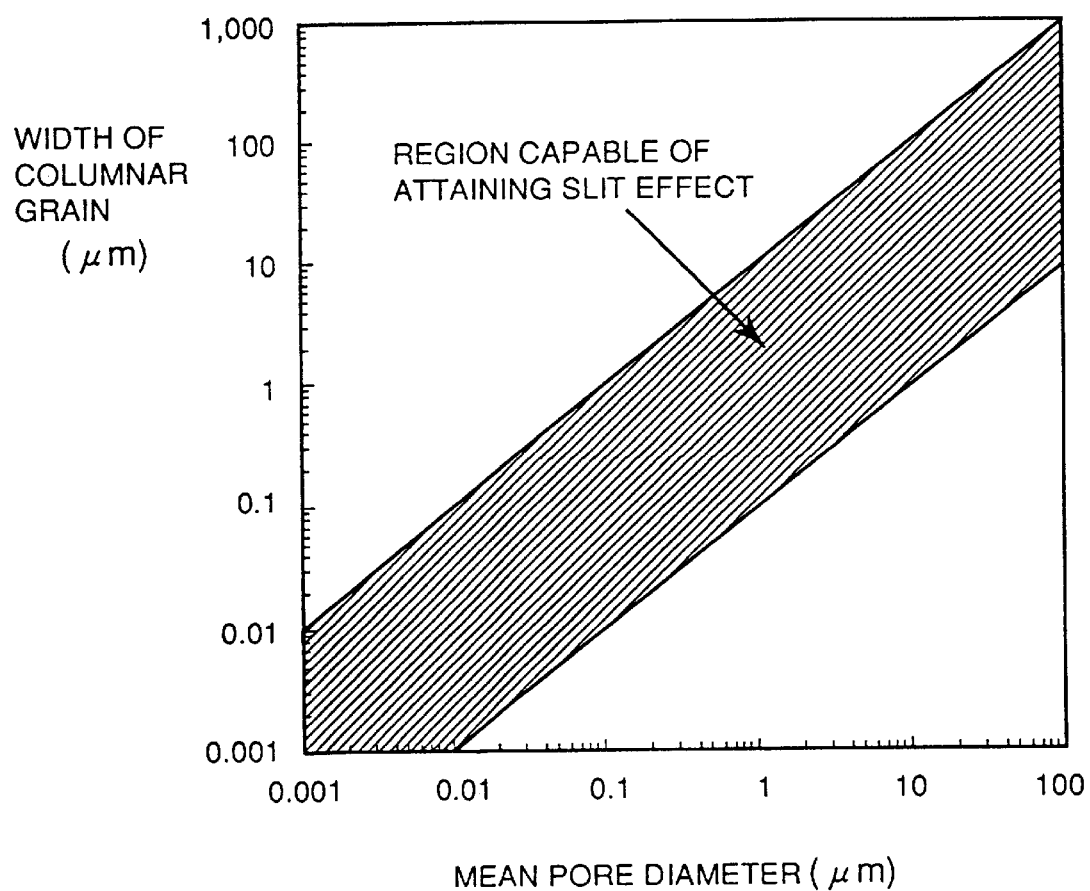
FIG. 1 illustrates the range capable of attaining a slit effect in the inventive silicon nitride porous body.

DETAILED DESCRIPTION OF THE PREFERRED EMBODIMENTS (Example 1)

Yttrium oxide powder of 0.55 μm in mean grain diameter was added to α-silicon nitride powder of 0.5 μm in mean grain diameter (α-ratio: 99%) in amounts shown in Table 2, and these powder materials were mixed with each other in a ball mill for 72 hours, with a solvent of ethanol. The oxygen content of the α-silicon nitride powder was 2.0 wt. %.

The mixed powder materials obtained in the aforementioned manner were dried and thereafter molded in a metal mold of 100 mm by 100 mm under a pressure of 35 kg/cm², with addition of molding assistants. The obtained compacts were about 15 mm in thickness and about 42% in relative density in all compositions. The relative density of each compact was obtained by dividing a compact density, which is calculated by measuring the weight and the dimensions, by a theoretical density, which is the weighted mean of silicon nitride and the additive. The compacts were heat treated under conditions shown in Table 2, thereby obtaining silicon nitride porous bodies.

These porous bodies were held in hydrochloric acid of 10N concentration for 2 hours, whereby yttrium chloride was generated and the colors of the solutions turned pale yellow. The temperature of the hydrochloric acid was 22° C. at this time. When these solutions were analyzed, yttrium ions were detected in amounts substantially identical to those of the additives. Thus, it was conceivably possible to substantially completely remove the additives by the acid treatments.

Test pieces of 3 mm by 4 mm by 40 mm for a three-point bending test in accordance with JIS 1601 were prepared from these porous bodies. These test pieces were employed for measuring values of bending strength (strength) at ordinary, e.g. room, temperature. Further, porosity values were calculated from relative densities, as follows:

porosity (%) 100−relative density (%)

In addition, X-ray diffraction was performed for obtaining ratios (βratios) of β-silicon nitride crystal grains from X-ray diffraction peak intensity ratios, as follows:

(ratio of β-silicon nitride) (%)={a/(A+B)}×100 where A represents X-ray diffraction peak intensity of β-silicon nitride, and B represents X-ray diffraction peak intensity of α-silicon nitride.

Cutting planes were observed with a scanning electron microscope (SEM), thereby obtaining ratios (ratios of columnar grains) of columnar grains of β-silicon nitride crystals relative to silicon nitride crystal grains of other shapes. Measurements were also taken of the mean widths (crystal grain widths) of the columnar grains of the β-silicon nitride crystals in the minor axis direction and aspect ratios. The aspect ratios shown in Table 2 are arithmetic means of the aspect ratios of the columnar grains observed on the cutting planes. On the other hand, mean pore diameters were measured with a mercury porosimeter (AUTOSCAN-60 by Quantachrome Co.). Table 2 shows these results too.

2100° C. In this case, the porosity was reduced below 20 vol. %, with formation of 5 vol. % of closed pores. The ratio of the closed pores was calculated from apparent porosity and a cumulative pore volume measured with the mercury porosimeter.

As to the sample No. 4, three-point bending strength measured in case of performing no acid treatment was 173 MPa, and it was proved that the strength was hardly deteriorated when the acid treatment was performed.

(Example 2)

Porous bodies were prepared by a method similar to that in Example 1 except that oxide powder materials of various

TABLE 2

| | Additive | | | | Porous Body Characteristics | | | | | | |
|---|---|---|---|---|---|---|---|---|---|---|---|
| No. | $Y_2O_3$ (vol. %) | Temperature (°C.) | Heating Time (H) | Atmosphere Pressure (atm) | Porosity (%) | Mean Pore Diameter (μm) | Aspect Ratio | Crystal Grain Width (μm) | Strength (MPa) | β ratio (%) | Ratio of Columnar Grains |
| 1 | 0 | 1800 | 2 | 4 | 60 | 1 | — | 1 | 1.4 | 28 | 0 |
| 2 | 1 | 1800 | 2 | 4 | 41 | 0.6 | 3.8 | 0.65 | 62 | 100 | 94 |
| 3 | 2 | 1800 | 2 | 4 | 52 | 0.71 | 15 | 0.5 | 99 | 100 | 95 |
| 4 | 4 | 1800 | 2 | 4 | 53 | 0.8 | 15 | 0.5 | 167 | 100 | 100 |
| 5 | 12 | 1800 | 2 | 4 | 71 | 1.2 | 13 | 0.59 | 83 | 97 | 100 |
| 6 | 20 | 1800 | 2 | 4 | 74 | 2.5 | 8 | 0.57 | 71 | 96 | 99 |
| 7 | 30 | 1800 | 2 | 4 | 83 | 12.5 | 4 | 1.2 | 35 | 100 | 97 |
| 8 | 4 | 1500 | 2 | 4 | 66 | 0.11 | — | 0.5 | 0.3 | 18 | 0 |
| 9 | 4 | 1600 | 2 | 4 | 63 | 0.26 | 3.8 | 1.5 | 1.1 | 24 | 0 |
| 10 | 4 | 1700 | 2 | 4 | 58 | 0.31 | 18 | 0.7 | 128 | 96 | 96 |
| 11 | 4 | 1800 | 2 | 4 | 53 | 0.8 | 15 | 0.5 | 167 | 100 | 100 |
| 12 | 4 | 1900 | 2 | 4 | 49 | 0.95 | 10 | 1.5 | 106 | 100 | 99 |
| 13 | 4 | 2000 | 2 | 4 | 43 | 0.49 | 6.9 | 1.7 | 63 | 100 | 97 |
| 14 | 4 | 2100 | 2 | 4 | 36 | 0.39 | 3.7 | 2 | 47 | 100 | 98 |
| 15 | 4 | 2200 | 2 | 100 | 16 | 0.24 | 2 | 2.5 | 10 | 100 | 100 |
| 16 | 4 | 1800 | 1 | 4 | 58 | 0.25 | 10 | 0.41 | 87 | 96 | 92 |
| 17 | 4 | 1800 | 5 | 4 | 56 | 0.3 | 13 | 0.36 | 157 | 100 | 100 |
| 18 | 4 | 1800 | 10 | 4 | 50 | 0.3 | 17 | 0.44 | 178 | 100 | 100 |
| 19 | 4 | 1800 | 20 | 4 | 46 | 0.18 | 16 | 1.4 | 63 | 100 | 100 |

Changes of the characteristics of the porous bodies in case of changing the amounts of the additives and the heating temperatures are understood from Table 2. In the sample No. 1 containing no additive, no columnar grains were generated and no progress of phase transition to β-silicon nitride was attained. On the other hand, the sample No. 7 contained the additive in excess of 20 vol. %. It is understood that the pores formed by the acid treatment were increased in diameter beyond the range capable of attaining a preferable slit effect. In the samples Nos. 8 and 9, the heating temperatures were lower than 1700° C. In this case, columnar grains were hardly formed and preferable structures were not obtained although the samples were brought into porous states. In the sample No. 15, the heating temperature was in excess of rare earth elements shown in Table 3 were employed as compounds of rare earth elements in place of yttrium oxide powder, and evaluated. Table 3 shows the results. It is understood from these results that similar silicon nitride porous bodies can be obtained also when compounds of rare earth elements other than yttrium oxide are employed.

TABLE 3

| Additive | Additive Ratio (%) | Porosity (%) | Mean Pore Diameter (μm) | Aspect Ratio | Crystal Grain Width (μm) | Strength (MPa) | β Ratio (%) | Ratio of Columnar Grains (%) |
|---|---|---|---|---|---|---|---|---|
| $La_2O_3$ | 4 | 53 | 1.8 | 12 | 1.4 | 135 | 100 | 98 |
| $CeO_2$ | 4 | 54 | 2.4 | 9 | 1.4 | 114 | 100 | 99 |
| $Nd_2O_3$ | 4 | 57 | 1.7 | 11 | 1.3 | 106 | 100 | 100 |
| $Gd_2O_3$ | 4 | 55 | 2.3 | 14 | 1.5 | 127 | 100 | 96 |
| $Dy_2O_3$ | 4 | 59 | 2.7 | 12 | 1.6 | 145 | 100 | 97 |
| $Yb_2O_3$ | 4 | 57 | 2.4 | 13 | 1.5 | 136 | 100 | 99 |

(Example 3)

Silicon nitride porous bodies were prepared by a method similar to that in Example 1 except that 4 vol. % of yttrium oxide which is an oxide of a rare earth element serving as an additive A and titanium oxide (mean grain diameter: 0.5 μm) or zirconium oxide (mean grain diameter: 0.65 μm), which is a compound of a transition metal element other than the rare earth element, for serving as an additive B were added in each sample, and evaluated. Table 4 shows the results.

(Example 4)

Porous bodies were prepared by a method similar to that in Example 1 except that 4 vol. % of yttrium oxide, which

TABLE 4

| | Additive | | | Porous Body Characteristics | | | | | |
|---|---|---|---|---|---|---|---|---|---|
| | | | | Mean Pore | | Crystal | | | Ratio of |
| No. | Additive B | (vol. %) | Heating Temperature | Porosity (%) | Diameter (μm) | Aspect Ratio | Grain Width (μm) | Strength (MPa) | β ratio (%) | Columnar Grains (%) |
| 1 | TiO₂ | 0.5 | 1800 | 45 | 0.61 | 12 | 1 | 120 | 98 | 84 |
| 2 | TiO₂ | 1.2 | 1800 | 42 | 0.63 | 14 | 0.7 | 150 | 99 | 96 |
| 3 | TiO₂ | 2 | 1800 | 40 | 0.54 | 16 | 0.5 | 175 | 100 | 100 |
| 4 | TiO₂ | 5 | 1800 | 35 | 0.52 | 11 | 0.5 | 225 | 100 | 100 |
| 5 | TiO₂ | 10 | 1800 | 28 | 0.21 | 8.9 | 0.3 | 345 | 97 | 96 |
| 6 | TiO₂ | 15 | 1800 | 15 | 4.3 | 3.3 | 0.33 | 320 | 96 | 94 |
| 7 | TiO₂ | 2 | 1500 | 47 | 0.3 | — | 0.3 | 0.3 | 11 | 0 |
| 8 | TiO₂ | 2 | 1600 | 44 | 0.3 | 4.6 | 0.5 | 75 | 65 | 88 |
| 9 | TiO₂ | 2 | 2100 | 31 | 0.21 | 15 | 1.5 | 287 | 100 | 100 |
| 10 | TiO₂ | 2 | 2200 | 18 | 0.02 | 12 | 2.6 | 396 | 100 | 100 |
| 11 | ZrO₂ | 0.5 | 1800 | 43 | 0.57 | 13 | 1.2 | 149 | 99 | 88 |
| 12 | ZrO₂ | 1.2 | 1800 | 40 | 0.67 | 12 | 0.8 | 164 | 99 | 96 |
| 13 | ZrO₂ | 2 | 1800 | 38 | 0.49 | 14 | 0.6 | 168 | 100 | 100 |
| 14 | ZrO₂ | 5 | 1800 | 30 | 0.39 | 11 | 0.7 | 241 | 100 | 100 |
| 15 | ZrO₂ | 10 | 1800 | 24 | 0.24 | 9.1 | 0.42 | 321 | 96 | 97 |
| 16 | ZrO₂ | 15 | 1800 | 11 | 5.1 | 3.1 | 0.41 | 445 | 94 | 95 |
| 17 | ZrO₂ | 2 | 1500 | 48 | 0.3 | — | 0.36 | 0.16 | 13 | 0 |
| 18 | ZrO₂ | 2 | 1600 | 47 | 0.3 | 6 | 0.44 | 102 | 71 | 83 |
| 19 | ZrO₂ | 2 | 2100 | 22 | 0.18 | 4 | 1.4 | 246 | 100 | 100 |
| 20 | ZrO₂ | 2 | 2200 | 8 | 0.03 | 2 | 1.9 | 369 | 100 | 100 |

From Table 4, it is clearly understood that it is possible to prepare a silicon nitride porous body at a lower temperature (1600° C.) than that employed in Example 1 with addition of only the compound of the rare earth element. In the samples Nos. 8 and 18, it was possible to prepare target porous bodies of the present invention at the heat treatment temperature of 1600° C. Further, it was possible to remove not only the compound of the rare earth element but also grain boundary phase parts resulting from the compounds of the transition metal elements by acid treatments.

The samples Nos. 6 and 16 contained the additives B in excess of 10 vol. %. In this case, the mean pore diameters of the porous bodies obtained by the acid treatments were increased beyond the range capable of attaining a preferable slit effect. In the sample No. 7, the heating temperature was lower than 1600° C. In this case, columnar grains were hardly formed and a preferable structure was not obtained although the sample was brought into a porous state.

is an oxide of a rare earth element, serving as an additive A and bismuth oxide, which is one of bismuth compounds, serving as an additive B were added to each sample, and evaluated. Table 5 shows the results.

TABLE 5

| | Additive | | | Porous Body Characteristics | | | | | |
|---|---|---|---|---|---|---|---|---|---|
| | | | | Mean Pore | | Crystal Grain | | | Ratio of |
| No. | Additive B | (vol. %) | Heating Temperature | Porosity (%) | Diameter (μm) | Aspect ratio | Width (μm) | Strength (MPa) | β ratio (%) | Columnar Grains (%) |
| 1 | Bi₂O₃ | 0.5 | 1700 | 57 | 0.45 | 18 | 0.69 | 110 | 96 | 96 |
| 2 | Bi₂O₃ | 1.2 | 1700 | 59 | 0.61 | 16 | 0.71 | 126 | 97 | 100 |
| 3 | Bi₂O₃ | 2 | 1700 | 61 | 0.75 | 13 | 0.73 | 137 | 100 | 100 |
| 4 | Bi₂O₃ | 5 | 1700 | 65 | 0.99 | 10.3 | 0.88 | 150 | 100 | 100 |
| 5 | Bi₂O₃ | 10 | 1700 | 69 | 1.2 | 4.9 | 0.91 | 110 | 100 | 100 |
| 6 | Bi₂O₃ | 15 | 1700 | 78 | 10.3 | 2.4 | 0.93 | 1.9 | 100 | 100 |
| 7 | Bi₂O₃ | 2 | 1500 | 65 | 0.28 | — | 0.37 | 3.1 | 21 | 0 |
| 8 | Bi₂O₃ | 2 | 1600 | 63 | 0.39 | 16 | 0.58 | 76 | 89 | 96 |
| 9 | Bi₂O₃ | 2 | 1800 | 55 | 1 | 15 | 0.51 | 148 | 100 | 100 |

As clearly understood from Table 5, it was possible to reduce the formation temperatures for the columnar grains by adding bismuth, without changing the structures of the silicon nitride porous bodies. Further, the added bismuth oxide existed as grain boundary phases, which were removable by acid treatments. In particular, reaction was readily attained at room temperature using hydrochloric acid of pH 1, and it was possible to perform the acid treatments in short times.

The sample No. 6 contained the additive B in excess of 10 vol. %. In this case, the pores formed by the acid treatment were increased in diameter beyond the range capable of attaining a preferable slit effect. In the sample No. 7, the heating temperature was lower than 1600° C. In this case, columnar grains were hardly formed and a preferable structure was not obtained although the sample was brought into a porous state.

(Example 5)

When the sample No. 4 prepared in Example 1 was further treated in sodium hydroxide having a pH value of 14, a small amount of silicon was eluted in the solution. The amount of elution was 4 to 10 ppm.

When this sample was further placed without agitation in sodium hydroxide having a pH value of 14 and sodium hypochlorite having a pH value of 12 for 24 hours at 20° C. and 110° C. respectively, elution of silicon was not more than a measurement limit (several ppm).

It is understood from the aforementioned results that the inventive porous body can be used as an extremely stable filter or catalytic carrier with no elution of silicon or the like when it is used in an environment in coexistence with an alkali.

(Example 6)

Flat plates of 25 mm in diameter and 0.5 mm in thickness were prepared from the samples Nos. 1, 4 and 7 (hereinafter referred to as samples Nos. 1-1, 1-4 and 1-7 respectively) of Example 1 and the sample No. 6 (hereinafter referred to as a sample No. 3-6) of Example 3 respectively. These flat plates were employed for allowing permeation therethrough of water in which latex standard grains having homogeneous grain diameters were dispersed, thereby measuring the minimum grain diameters of collectable grains. This is a method of estimating or judging whether or not grains of prescribed sizes permeate the pores, based on concentration changes before and after permeation, thereby measuring the filter performance under the same conditions as actually exist when employing the porous bodies as filters. This is in comparison to a method employing a mercury porosimeter for calculating the pore areas from a pressure necessary for press fitting and from volume changes and consequently measuring diameters of circles having equivalent areas as pore diameters. Results obtained by the presently described measurement also serve as means for measuring the maximum pore diameters of the porous bodies.

Table 6 shows the results.

TABLE 6

| Sample | Pore Diameter ($\mu$m) | Minimum Filterable Grain Diameter ($\mu$m) |
| --- | --- | --- |
| 1-1 | 1 | 1.5 |
| 1-4 | 0.8 | 0.2 |
| 1-7 | 12.5 | 15.0 |
| 3-6 | 4.3 | 6.0 |

From the aforementioned results, it is understood that it is possible to collect grains smaller than the pore diameters in the sample No. 1-4, which is capable of attaining a slit effect. In the remaining samples, however, it was possible to collect only grains larger than the pore diameters, since the pore diameters had distributions such that the maximum pore diameters were larger than the mean pore diameters.

Table 7 shows pure water permeation flow rates of the sample No. 1-4 and a comparative $\alpha$-alumina filter having non-slit pores capable of collecting grains of 0.2 $\mu$m.

TABLE 7

| Sample | Pore Sectional Area (per pore) ($\mu$m$^2$) | Pure Water Permeation Flow Rate (Ml/min/cm$^2$) |
| --- | --- | --- |
| 1-4 | 1.0 | 32.8 |
| $\alpha$-alumina | 0.04 | 2.49 |

The sample No. 1-4 has a high permeation flow rate since the permeation flow rate is generally proportionate to the sectional area of the pores. It is empirically known that the permeation flow rate of a porous body having the same structure as this is proportionate to the plane area of the pores. However, the results obtained this time are different, conceivably because the pores of the alumina porous body are close to circular shapes and the alumina grains forming the porous body have polygonal shapes close to spherical shapes in the comparative $\alpha$-alumina filter, while columnar grains are entangled with each other to define a three-dimensional space and holes or pores are in the form of wedges or slits in the sample No. 1-4, and hence the difference between the hole shapes influenced the results.

While the alumina porous body had a porosity of 30 to 40%, that of the silicon nitride porous body (sample No. 1-4) was 53%. This difference is also reflected in the difference between the permeation flow rates. The porosity can be maximized up to 75% through the amount of the additive and by the acid/alkali treatment. In another porous body (alumina or the like) having similar pore diameters, on the other hand, the porosity is about 40% in general, and the porous body is so reduced in strength that the same cannot withstand actual use as a filter or a catalytic carrier if the porosity exceeds this value.

(Example 7)

In the sample No. 4 of Example 1, silicon nitride porous bodies were prepared through a process similar to that of Example 1, with $\alpha$-silicon nitride powder serving as a raw material powder having oxygen contents of 0.5 wt. % and 10 wt. % respectively. In case of the oxygen content of 0.5 wt. %, the ratio of columnar grains among the $\beta$-silicon nitride grains was 1.3 vol. %. This is conceivably because the amount of liquid phase formation was so insufficient that the columnar grains were hard to grow. In case of the oxygen content of 10 wt. %, on the other hand, crystal grains fell out due to an acid treatment. Further, an oxy-nitride was formed to reduce purity of the silicon nitride to 88%.

The crystal grains fell out since the oxy-nitride and the grain boundary phase were present between the columnar grains, which inhibited direct bonding between the silicon nitride crystal grains (particularly the columnar grains). Such inhibitors result from reaction between an oxide layer on the surface of the raw material powder and the additive. Therefore, it is possible to obtain a porous body which is formed by directly bonded silicon nitride crystal grains by setting the oxygen content in the range of 1 to 8 wt. %.

(Example 8)

In the sample No. 4 of Example 1, powder containing 85 vol. % of $\alpha$-silicon nitride powder (mean grain diameter: 0.5 $\mu$m) and 15 vol. % of $\beta$-silicon nitride powder (mean grain diameter: 0.55 $\mu$m) was employed to prepare a silicon nitride porous body through a process similar to the above. In this case, heterogeneous crystal growth or contraction resulted in the interior of the silicon nitride porous body, such that the mean pore diameter was 4.0 $\mu$m and the mean width of the columnar grains in the minor axis direction was 0.33 $\mu$m. Thus, it was impossible to obtain a porous body having a preferable slit effect.

(Example 9)

Table 8 shows results obtained from silicon nitride porous bodies prepared under the same conditions as those for the samples Nos. 11 to 16 of Example 3 except that zirconium oxide having a mean grain diameter of 0.2 μm was employed.

TABLE 8

| | Additive | | | Porous Body Characteristics | | | | | |
|---|---|---|---|---|---|---|---|---|---|
| | | | | | Mean Pore | | Crystal Grain | | Ratio of |
| No. | Additive B | (vol. %) | Heating Temperature | Porosity (%) | Diameter (μm) | Aspect Ratio | Width (μm) | Strength (MPa) | β ratio (%) | Columnar Grains (%) |
| 1 | $ZrO_2$ | 0.5 | 1800 | 43 | 0.69 | 16 | 0.5 | 136 | 99 | 89 |
| 2 | $ZrO_2$ | 1.2 | 1800 | 40 | 0.56 | 14.2 | 0.56 | 169 | 98 | 94 |
| 3 | $ZrO_2$ | 2 | 1800 | 38 | 0.49 | 12.6 | 0.75 | 173 | 100 | 100 |
| 4 | $ZrO_2$ | 5 | 1800 | 30 | 0.39 | 13 | 0.89 | 251 | 100 | 100 |
| 5 | $ZrO_2$ | 10 | 1800 | 24 | 0.33 | 9.1 | 1.2 | 336 | 97 | 96 |
| 6 | $ZrO_2$ | 15 | 1800 | 11 | 5.1 | 2.9 | 0.48 | 462 | 91 | 87 |

From the aforementioned results, it is understood that the powder of zirconium oxide was more homogeneously dispersed to influence growth of the columnar grains such that the mean widths (crystal grain widths) of the columnar grains in the minor axis directions were increased as the added amounts of zirconium oxide were increased. The sample No. 6 contained zirconium oxide in excess of 10 vol. %. In this case, pores formed by the acid treatment were increased in diameter beyond the range of the mean pore diameter and the mean width of the columnar grains in the minor axis direction capable of attaining a preferable slit effect.

(Example 10)

In the sample No. 15 of Example 1, the porosity was 13 vol. % before the acid treatment. Since the porosity before the acid treatment was not more than 19 vol. %, it is understood that the grain boundary phase was not completely removed by the acid treatment.

(Example 11)

The sample No. 4 in Example 1 was heated in the atmosphere at a temperature of 1000° C., and thereafter thrown into ice water of 0° C. to be subjected to a thermal shock. The measured three-point bending strength of this sample was 165 MPa, which was substantially identical to that before application of the thermal shock. Thus, it is understood that this sample can withstand a thermal shock of 1000° C.

(Example 12)

In the method of Example 1, 5 vol. % of yttrium oxide and titanium nitride were added to samples which were then molded and heat treated, thereby preparing silicon nitride porous bodies. Table 9 shows the amounts of added titanium nitride. The obtained porous bodies were treated in aqueous hydrochloric acid solutions of 10N concentration, to measure the ratios of columnar crystal grains in β-silicon nitride. Table 9 shows these results too.

TABLE 9

| Sample No. | TiN (vol. %) | Ratio of Columnar grains (%) |
|---|---|---|
| 1 | 0.5 | 100 |
| 2 | 1.5 | 95 |
| 3 | 7.0 | 75 |
| 4 | 12.0 | 36 |

When the amount of titanium nitride (TiN) was less than 1.0 vol. %, the ratio of the columnar crystal grains was 100%. On the other hand, it was understood that a preferable structure was not obtainable when the amount of titanium nitride was in excess of 8 vol. %, although the sample was converted to a porous state with formation of a small amount of columnar grains.

(Example 13)

Figure 2:
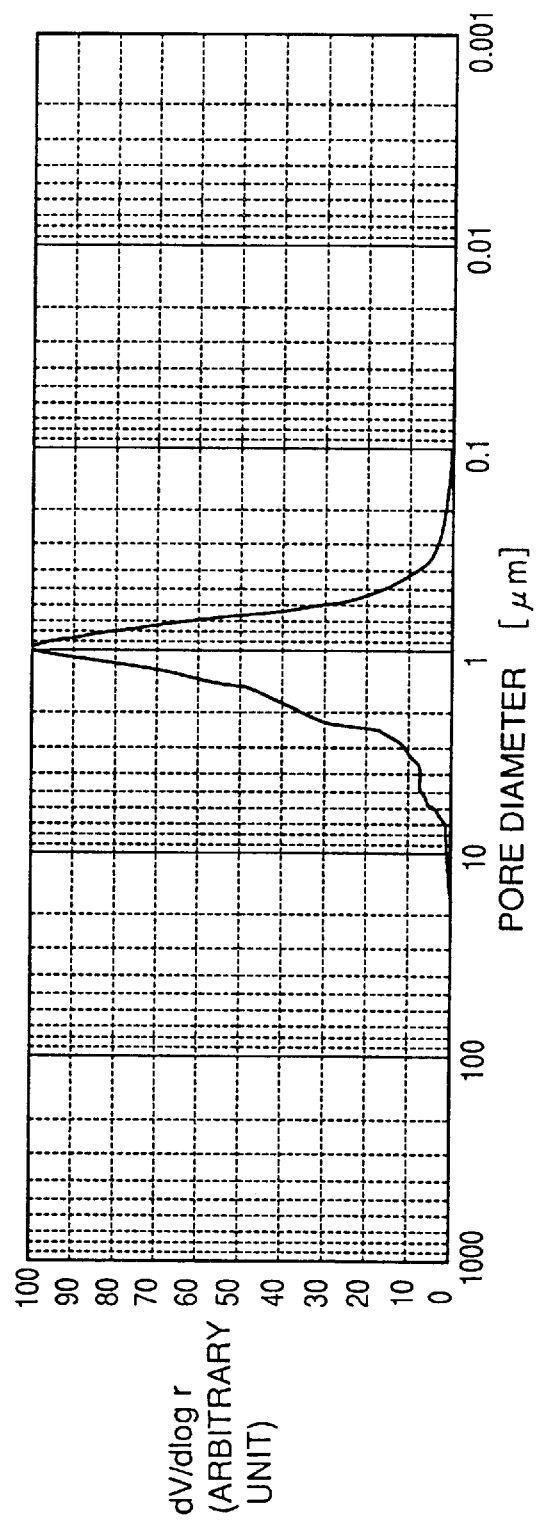
FIG. 2 illustrates an exemplary pore diameter distribution of a silicon nitride porous body.
Figure 3:
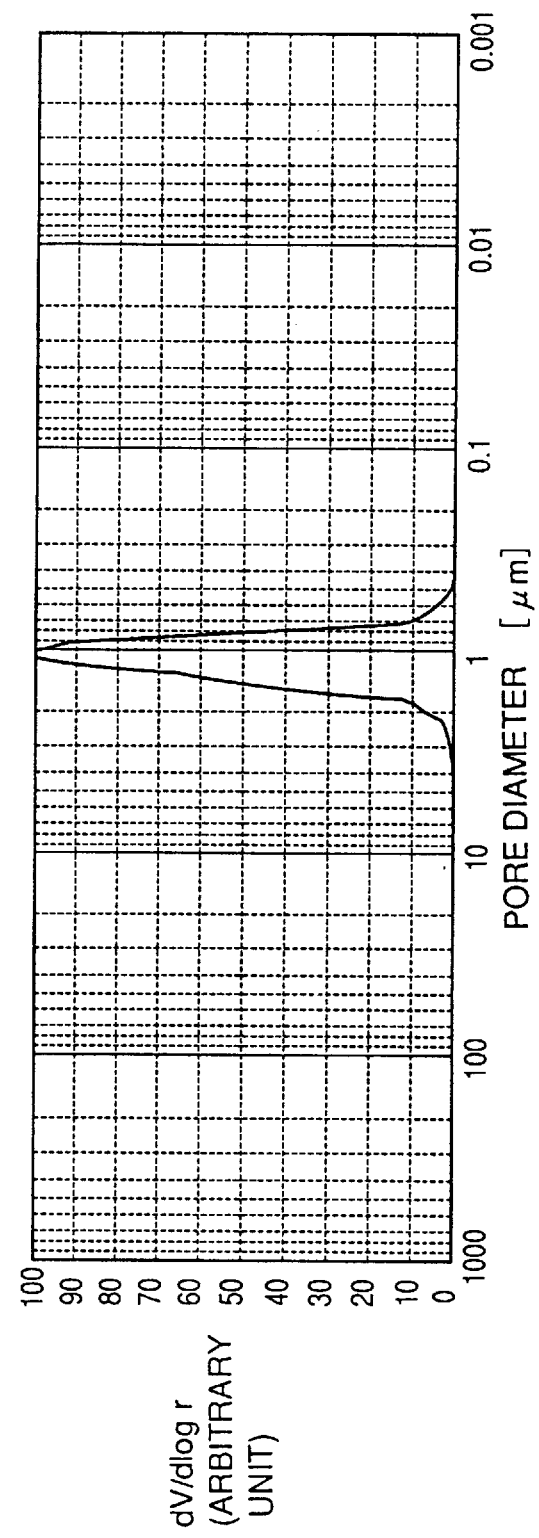
FIG. 3 illustrates another exemplary pore diameter distribution of a silicon nitride porous body.

FIGS. 2 and 3 show pore diameter distributions measured with a mercury porosimeter (AUTOSCAN-60 by Quantachrome Co.) as to silicon nitride porous bodies (samples 1 and 2) having mean pore diameters of 1.2 μm and 1.0 μm and ratios of columnar grains of 20% and 95% respectively. In the porous body having a low ratio of columnar grains, the pore diameter distribution tends to be broad. When the ratio of columnar grains exceeds 80%, on the other hand, a sharp pore diameter distribution is attained as shown in FIG. 3. Permeability for a gas or a liquid is improved and higher strength can be attained as the pore diameter distribution is narrowed.

(Example 14)

Porous bodies prepared from the sample No. 4 obtained in Example 1 were heat treated in the atmosphere for two hours, at temperatures of 200° C., 500° C. and 800° C. respectively. When the surfaces of these porous bodies were analyzed with FT-IR (Fourier transform infrared spectroscopic analysis), peaks of Si-O-N and Si-N were observed. These porous bodies were worked into disks of 25 mm in diameter and 0.5 mm in thickness, for measuring pure water permeation flow rates. Table 10 shows the results.

TABLE 10

| Heat Treatment Temperature (°C.) | Pure Water Permeation Flow Rate (ml/min/cm$^2$) |
| --- | --- |
| untreated | 32.8 |
| 200 | 37.5 |
| 500 | 51.9 |
| 800 | 64.1 |

The pure water permeation flow rates were increased as the heat treatment temperatures were increased, such that the sample heat treated at the temperature of 800° C. attained pure water permeability which was twice that of an untreated product.

As to pore diameter distributions and filterability, on the other hand, no differences were observed between the heat treated samples and the untreated product.

While the reason why the pure water permeation flow rate is increased when the silicon nitride porous body is heat treated in the atmosphere is not clear, it is supposed that the surface states of the crystal grains forming the silicon nitride porous body are changed to those having higher hydrophilicity, considering the results of the FT-IR. If the heat treatment temperature exceeds 1000° C., oxidation of the silicon nitride porous body so abruptly progresses that the strength may be reduced, and hence the heat treatment temperature is preferably not more than 1000° C. When the silicon nitride porous body is employed in an application that does not require particular strength, however, the heat treatment may be performed at a temperature exceeding 1000° C. While water permeability of the silicon nitride porous body is improved as the heat treatment temperature is increased in this case, the degree of reduction of the strength of the silicon nitride porous body is so increased that the silicon nitride porous body cannot be used for a filter if the heat treatment temperature exceeds 1500° C.

A silicon nitride porous body which is treated in the aforementioned manner can be used for a filter such as a membrane filter, to exhibit extremely high permeability.

(Example 15)

Table 11 shows changes of porosity and collection ratios for latex grains of 0.2 μm in grain diameter, when phenol is added as a carbon source in the step of preparing the mixed powder of the sample No. 4 in Example 1, and when the residual carbon contents are varied in the stage of forming the compact.

TABLE 11

| Residual Carbon (wt. %) | Porosity (%) | 0.2 μm Latex Grain Collection Ratio (%) |
| --- | --- | --- |
| 0 | 53 | 99.9 |
| 0.1 | 53.5 | 99.9 |
| 0.2 | 55 | 99.9 |
| 0.5 | 57 | 99.9 |
| 1.0 | 61 | 99.9 |
| 1.5 | 65 | 25 |

It is understood that the porosity is increased as the residual carbon content in the compact is increased. It is also understood that the collection ratio for the latex grains is reduced and no slit effect can be attained if the residual carbon content in the compact is more than 1.0 wt. %. It is understood that the porosity of the porous body does not so improve if the residual carbon content in the compact is less than 0.1 wt. %.

When the carbon contents of the prepared silicon nitride porous bodies were measured, it was understood that carbon remained in an amount of not more than 0.1 wt. % in the finished porous body because the carbon was removed in the final heat treatment step, as to the sample that had the residual carbon content of not more than 1.0 wt. % in the non-heat-treated compact stage.

Although the present invention has been described with reference to certain Examples, variations and modifications are possible within the scope of the present invention, in addition to the above described Examples.

The silicon nitride porous body obtained according to the present invention contains a plurality of silicon nitride crystal grains so that holes or pores are formed in the grain boundary parts thereof, or comprises a body part and a hole or pore part so that the body part is formed by a plurality of silicon nitride crystal grains and the hole part forms a three-dimensional network structure. Therefore, it is possible to provide a porous body which can be effectively employed as a filter or a catalytic carrier.

Further, the body part of the inventive silicon nitride porous body is formed by at least 90 vol. % of silicon nitride crystal grains, whereby the porous body is stable against an acid or an alkali and exerts no influence on a filtered substance when the same is used as a filter of a chemical apparatus, for example.

Also when the inventive porous body is employed as a catalytic carrier, the porous body will not react with a catalyst in a manner that would suppress catalytic reaction.

Further, at least 50 vol. % of the silicon nitride crystal grains forming the inventive silicon nitride porous body are β-silicon nitride crystal grains, whereby the porous body has excellent mechanical strength and durability. When at least 80 vol. % of the β-silicon nitride crystal grains are formed by columnar grains having an average aspect ratio of at least 3 and not more than 50, further, it is possible to obtain a porous body structure in which the columnar grains are directly bonded to each other. When the porous body is employed as a filter or a catalytic carrier, therefore, it is possible to attain excellent mechanical strength and superior durability for allowing long-term use.

In addition, a slit effect can be attained by controlling the widths of the columnar grains in the minor axis direction and the mean pore diameter, whereby the inventive silicon nitride porous body can be employed as a filter having both of permeability and separability.

According to the inventive method, a grain boundary phase part containing an impurity such as the additive is removed by an acid and/or alkali treatment to leave stable silicon nitride crystal grains, whereby it is possible to provide a filter which can be used in an environment in coexistence with an acid or an alkali.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of preparing a silicon nitride porous body, comprising the steps of:

preparing a porous body mainly composed of columnar grains of silicon nitride and grain boundary phases of at least one oxide; and bringing said porous body into contact with an acid for at least partially dissolving and removing said grain boundary phases.

2. The method of preparing a silicon nitride porous body in accordance with claim 1, further comprising the step of bringing said porous body into contact with an alkali after said step of bringing said porous body into contact with said acid.

3. The method of preparing a silicon nitride porous body in accordance with claim 1, wherein said step of preparing said porous body includes the steps of:

preparing a mixed powder by adding at least one compound powder of a rare earth element in a proportion of at least 1 vol. % and not more than 20 vol. % in terms of an oxide of said rare earth element, to a silicon nitride powder, preparing a compact from said mixed powder, and heat treating said compact in a nitrogen-containing atmosphere at a temperature of at least 1700° C. and not more than 2100° C.

4. The method of preparing a silicon nitride porous body in accordance with claim 3, wherein said silicon nitride powder contains at least 90 vol. % of one form of silicon nitride selected from the group consisting of α-silicon nitride, β-silicon nitride and amorphous silicon nitride.

5. The method of preparing a silicon nitride porous body in accordance with claim 4, wherein said silicon nitride powder further contains at least 1 wt. % and not more than 8 wt. % of oxygen.

6. The method of preparing a silicon nitride porous body in accordance with claim 3, wherein said step of preparing said mixed powder further includes the step of adding a carbon source to said silicon nitride powder in a proportion so that not more than 1.0 wt. % of carbon remains in said compact directly before said heat treatment step.

7. The method of preparing a silicon nitride porous body in accordance with claim 1, wherein said step of preparing said porous body includes the steps of:

preparing a mixed powder by adding at least one compound powder of a rare earth element in a proportion of at least 1 vol. % and not more than 20 vol. % in terms of an oxide of said rare earth element, and at least one compound powder of a transition metal element other than said rare earth element in a proportion in excess of 0 vol. % and not more than 10 vol. % in terms of an oxide of said transition metal element, to a silicon nitride powder, preparing a compact from said mixed powder, and heat treating said compact in a nitrogen-containing atmosphere at a temperature of at least 1600° C. and not more than 2100° C.

8. The method of preparing a silicon nitride porous body in accordance with claim 7, wherein said silicon nitride powder contains at least 90 vol. % of one form of silicon nitride selected from the group consisting of α-silicon nitride, β-silicon nitride and amorphous silicon nitride.

9. The method of preparing a silicon nitride porous body in accordance with claim 8, wherein said silicon nitride powder further contains at least 1 wt. % and not more than 8 wt. % of oxygen.

10. The method of preparing a silicon nitride porous body in accordance with claim 7, wherein said step of preparing said mixed powder further includes the step of adding a carbon source to said silicon nitride powder in a proportion so that not more than 1.0 wt. % of carbon remains in said compact directly before said heat treatment step.

11. The method of preparing a silicon nitride porous body in accordance with claim 1, wherein said step of preparing said porous body includes the steps of:

preparing a mixed powder by adding at least one compound powder of a rare earth element in a proportion of at least 1 vol. % and not more than 20 vol. % in terms of an oxide of said rare earth element, and a bismuth compound powder in a proportion in excess of 0 vol. % and not more than 10 vol. % in terms of an oxide of said bismuth, to a silicon nitride powder, preparing a compact from said mixed powder, and heat treating said compact in a nitrogen-containing atmosphere at a temperature of at least 1600° C. and not more than 1800° C.

12. The method of preparing a silicon nitride porous body in accordance with claim 11, wherein said silicon nitride powder contains at least 90 vol. % of one form of silicon nitride selected from a group consisting of α-silicon nitride, β-silicon nitride and amorphous silicon nitride.

13. The method of preparing a silicon nitride porous body in accordance with claim 12, wherein said silicon nitride powder further contains at least 1 wt. % and not more than 8 wt. % of oxygen.

14. The method of preparing a silicon nitride porous body accordance with claim 11, wherein said step of preparing said mixed powder further includes the step of adding a carbon source to said silicon nitride powder in a proportion so that not more than 1.0 wt. % of carbon remains in said compact directly before said heat treatment step.

15. The method of preparing a silicon nitride porous body in accordance with claim 1, further comprising the step of heat treating said porous body in the atmosphere at a temperature of at least 200° C. and not more than 1500° C. after said step of bringing said porous body into contact with said acid.

16. The method of preparing a silicon nitride porous body in accordance with claim 15, wherein said heat treating step is performed in the atmosphere at a temperature of at least 200° C. and not more than 1000° C.

17. The method of preparing a silicon nitride porous body in accordance with claim 2, further comprising the step of heat treating said porous body in the atmosphere at a temperature of at least 200° C. and not more than 1500° C. after said step of bringing said porous body into contact with said alkali.

18. The method of preparing a silicon nitride porous body in accordance with claim 17, wherein said heat treating step is performed in the atmosphere at a temperature of at least 200° C. and not more than 1000° C.

19. The method of preparing a silicon nitride porous body in accordance with claim 1, wherein said step of at least partially dissolving and removing said grain boundary phases forms or enlarges pores at locations of said grain boundary phases.

20. The method of preparing a silicon nitride porous body in accordance with claim 19, wherein said step of at least partially dissolving and removing said grain boundary phases forms or enlarges said pores in such a manner that said pores are interconnected to form a three-dimensional pore network between and around said columnar grains of silicon nitride.

21. The method of preparing a silicon nitride porous body in accordance with claim 1, wherein said step of preparing said porous body is carried out such that said porous body comprises at least 90 vol. % of said columnar grains of said silicon nitride, and said columnar grains are bonded directly to each other to form said porous body.

22. The method of preparing a silicon nitride porous body in accordance with claim 1, wherein said steps are carried out such that said porous body has a pore volume that is from 20 vol. % to 75 vol. % of a total volume of said porous body.

23. The method of preparing a silicon nitride porous body in accordance with claim 1, wherein said step of preparing said porous body is carried out such that said porous body essentially consists of silicon nitride crystal grains, of which at least 90 vol. % are β-silicon nitride crystal grains, of which at least 80 vol. % are said columnar grains of silicon nitride, and wherein said columnar grains have an average aspect ratio of at least 3 and not more than 50.

24. The method of preparing a silicon nitride porous body in accordance with claim 1, wherein said steps are carried out such that said columnar grains have a minor axis mean width d and said silicon nitride porous body has pores therein with a mean pore diameter r, such that $(d/10) \leq r \leq (10 \times d)$.

25. The method of preparing a silicon nitride porous body in accordance with claim 1, wherein said steps are carried out such that said columnar grains of silicon nitride have hydrophilic surfaces bounding pores within said porous body.

26. A method of making a ceramic porous body, comprising the following steps:

(a) preparing a base powder comprising silicon nitride powder;

(b) preparing a compact of said base powder by at least compression molding said base powder;

(c) heat treating said compact to form a preliminary porous body consisting essentially of silicon nitride crystal grains and grain boundary phases formed at least partially around said grains, wherein at least 50 vol. % of said silicon nitride crystal grains are β-silicon nitride crystal grains, and at least 80 vol. % of said β-silicon nitride crystal grains are columnar grains having an average aspect ratio of from 3 to 50; and (d) contacting said preliminary porous body with at least one of an acid and an alkali for at least partially dissolving and removing said grain boundary phases and thereby forming or enlarging pores between said grains at locations from which said grain boundary phases were dissolved and removed.

27. The method of making a ceramic porous body in accordance with claim 26, wherein said steps are carried out such that said ceramic porous body has a porosity of at least 52%.

* * * * *

UNITED STATES PATENT AND TRADEMARK OFFICE
CERTIFICATE OF CORRECTION

PATENT NO. : 5,846,460
DATED : Dec. 8, 1998
INVENTOR(S) : Matsuura et al.

It is certified that error appears in the above-identified patent and that said Letters Patent is hereby corrected as shown below:

Col. 4, lines 14 to 33, replace Table 1 as follows:

Table 1

| | Blending Composition of Mixed Powder (numerical value: volume percentage of specified element in terms of oxide) | | | Heat Treatment Conditions for Compact |
|---|---|---|---|---|
| | rare earth element compound powder | powder of compound of transition metal element other than rare earth element | bismuth compound powder | |
| (i) | 1 to 20 | - | - | in nitrogen-containing atmosphere 1700 to 2100°C |
| (ii) | 1 to 20 | in excess of 0 and not more than 10 | - | in nitrogen-containing atmosphere 1600 to 2100°C |
| (iii) | 1 to 20 | - | in excess of 0 and not more than 10 | in nitrogen-containing atmosphere 1600 to 1800°C |

Signed and Sealed this

Twenty-third Day of March, 1999

*Attest:*

Q. TODD DICKINSON

*Attesting Officer*    *Acting Commissioner of Patents and Trademarks*